April 19, 1949.  A. L. LIDFELDT ET AL  2,467,591
TESTING MECHANISM FOR PHOTOGRAPHIC FLASH LAMPS
Filed May 15, 1947  4 Sheets-Sheet 1
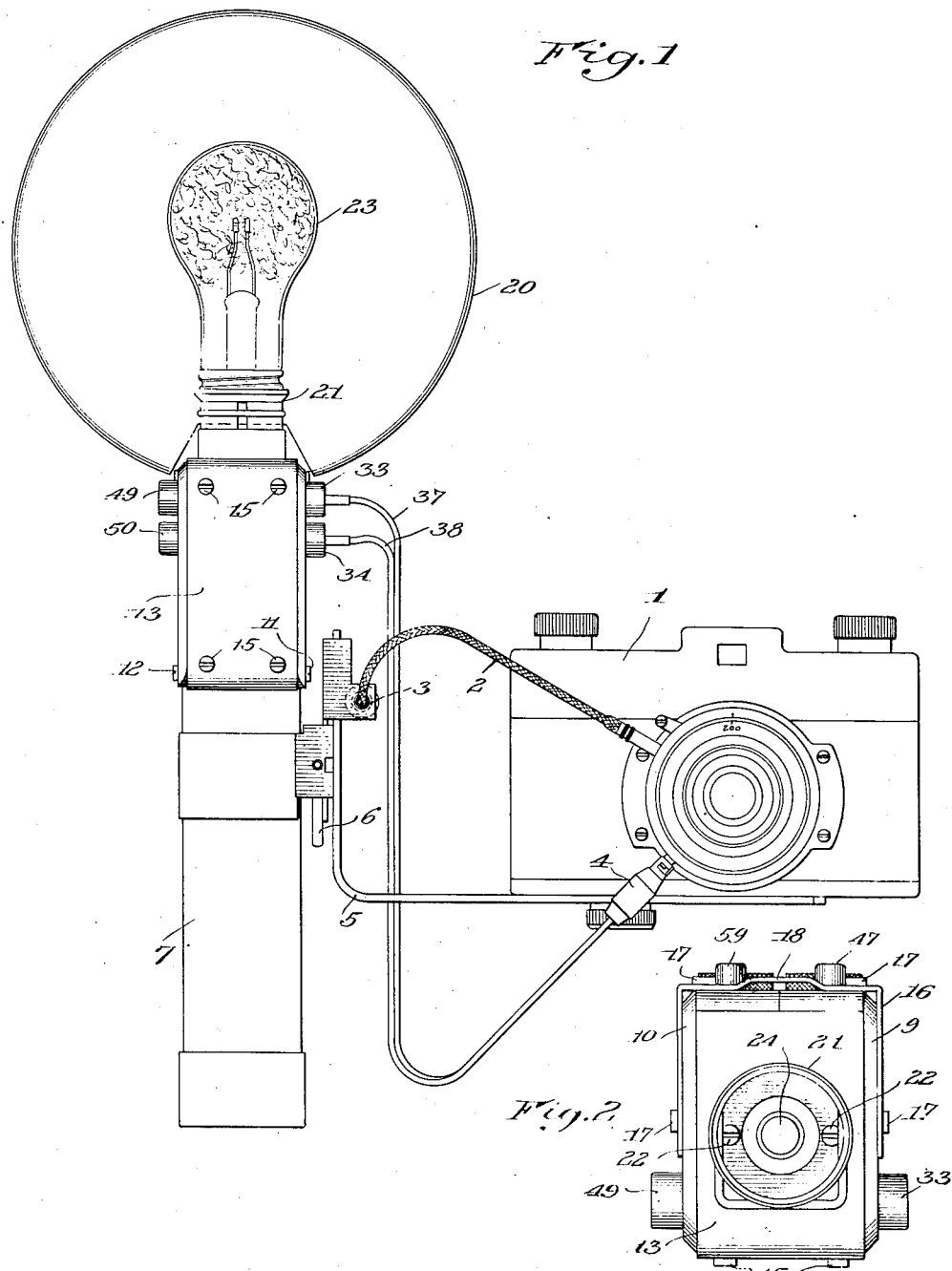
INVENTORS
Alfred L. Lidfeldt
Clarence Raymond Pickens
BY Harold E. Stonebraker,
their Attorney

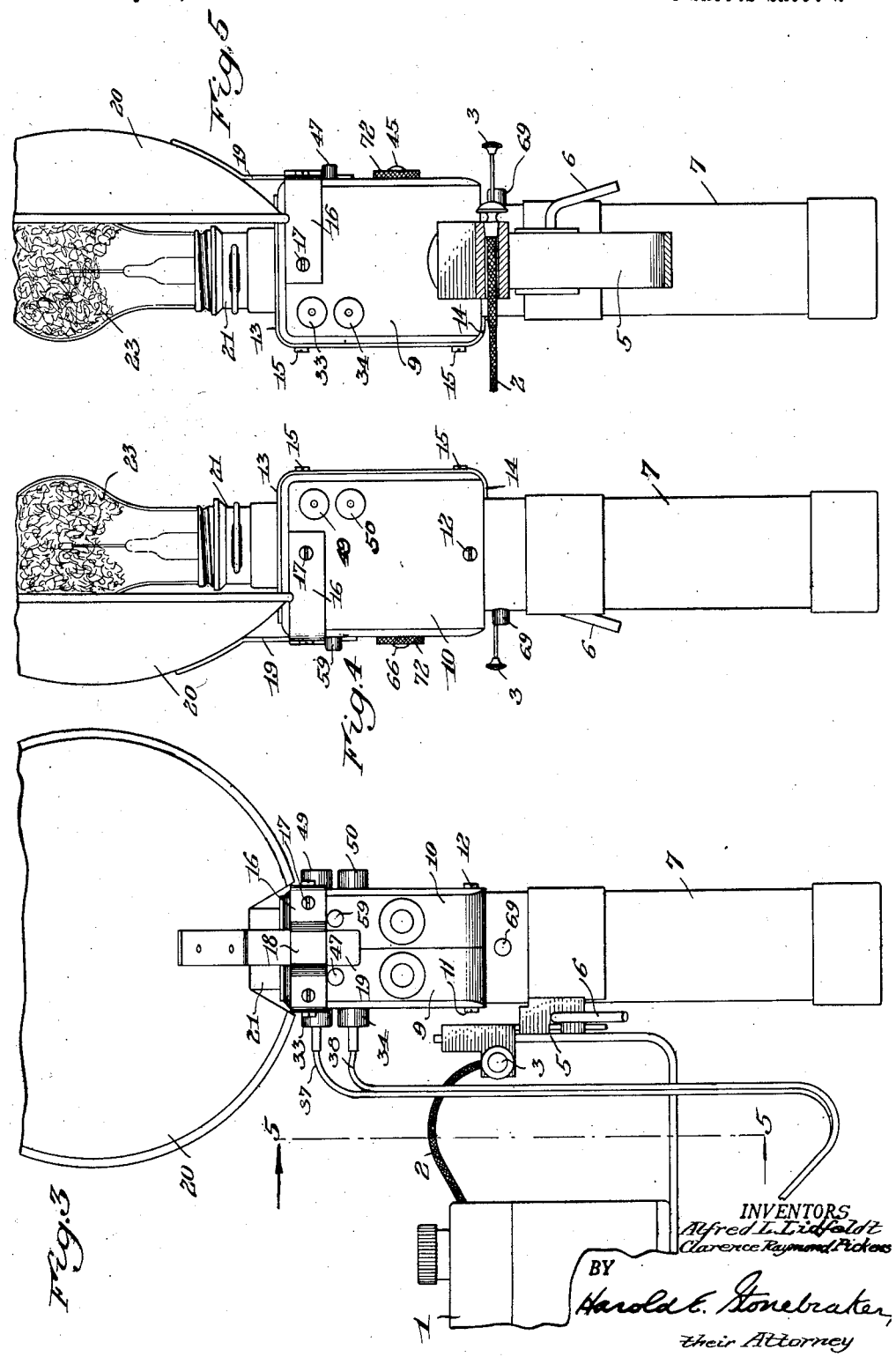

April 19, 1949.　　A. L. LIDFELDT ET AL　　2,467,591
TESTING MECHANISM FOR PHOTOGRAPHIC FLASH LAMPS
Filed May 15, 1947　　　　　　　　　　　　　　　　4 Sheets-Sheet 3
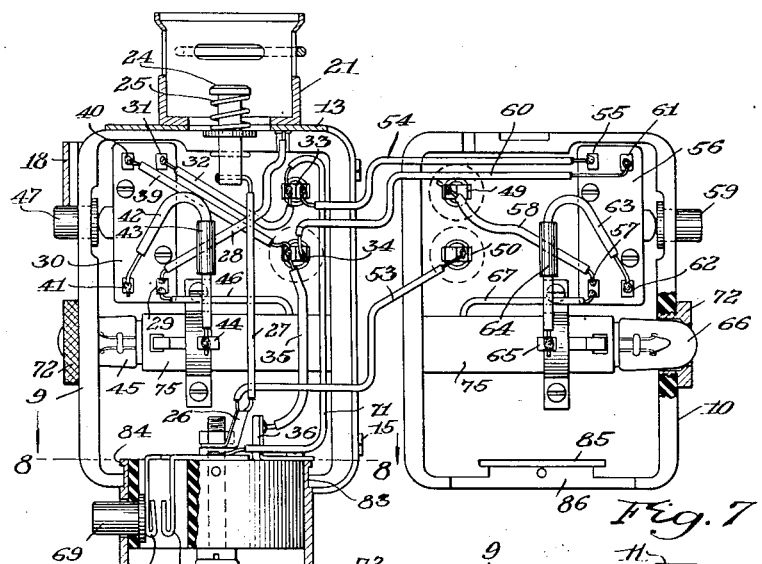
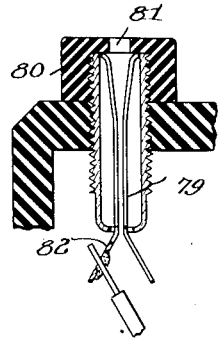
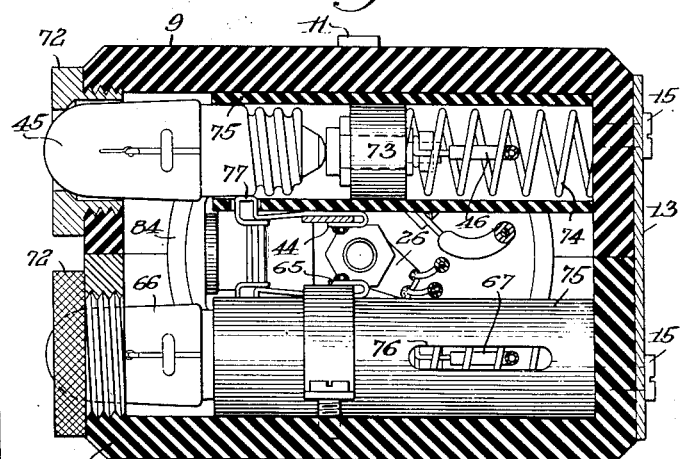
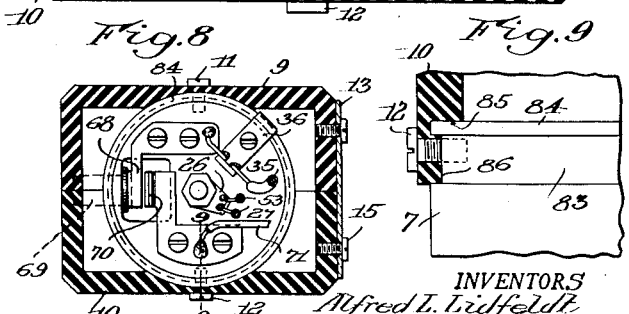
INVENTORS
Alfred L. Lidfeldt
Clarence Raymond Pickens
BY Harold E. Stonebraker
their Attorney

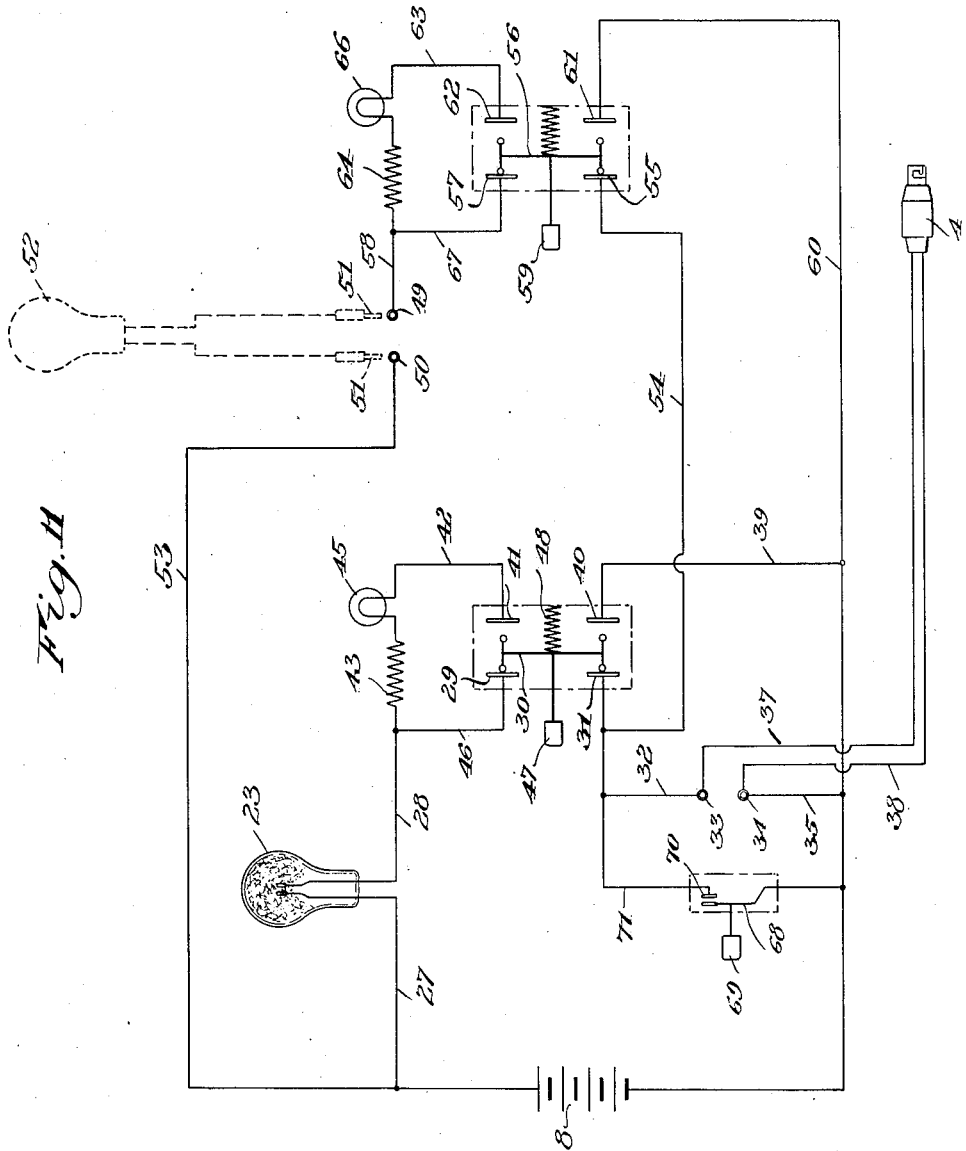

Patented Apr. 19, 1949

2,467,591

UNITED STATES PATENT OFFICE 2,467,591

TESTING MECHANISM FOR PHOTOGRAPHIC FLASH LAMPS

Alfred L. Lidfeldt and Clarence Raymond Pickens, Rochester, N. Y., assignors to Wollensak Optical Company, Rochester, N. Y., a corporation of New York Application May 15, 1947, Serial No. 748,368

3 Claims. (Cl. 67—31)

1

This invention relates to a testing mechanism for a photographic flash lamp, and has for one purpose to afford a simple, practical, and reliable mechanism for rapidly testing a flash lamp on a flash gun of a camera just prior to making an exposure, without danger of firing the flash lamp.

A more particular purpose of the invention is to afford a construction that is controlled from a point on the rear wall of a flash gun directly in front of the operator, so as to be conveniently accessible at the moment of taking a picture, and by which the condition of the flash lamp can be determined before operating the camera shutter, while preventing firing of the flash lamp during the testing operation.

An additional object of the invention is to adapt the mechanism to and combine it with the regular and extension flash lamp circuits of a camera, whereby either the flash lamp on the gun or the extension lamp, as well as their respective circuits, can be selectively and easily tested in a convenient operation that does not affect the flash lamps or the shutter operation.

Another purpose of the invention is to provide a compact and economical structure forming part of the flash gun and affording testing mechanism for both flash lamp circuits, including manual switch control buttons and test lamps located on and operated from the rear wall of the flash gun, so that when the operator is ready for an exposure, he may at the last moment, prior to making the exposure and without disturbing his position or that of the camera, operate one of the switches, depending on which flash lamp is to be tested, and determine instantly by the lighting of a test lamp that the corresponding flash lamp is perfect and ready for firing, without effecting such firing until the subsequent operation of the camera shutter.

Still a further object of the invention is to provide a test lamp and test circuit connected to a flash lamp and battery in such a way that by closing the test circuit switch, a circuit is completed from the battery to the flash lamp and test circuit, which latter includes a resistor that with the test lamp limits the amount of current passing through the flash lamp so that it is insufficient to fire the flash lamp but adequate to light the test lamp and indicate to the operator that the flash lamp and connections are in perfect condition for firing.

An additional purpose of the invention is to afford an arrangement of circuits that permits the use of a manual push button double-throw switch controlling the flash and testing circuits

2 of a camera flash gun, whereby the switch normally holds the flash circuit closed and the test circuit open, the switch being operable when testing to close the test circuit and open the flash circuit, and automatically restored when released to open the test circuit and close the flash circuit in readiness for a shutter operation.

Still another object of the invention is to afford an economical, practical, and compact arrangement for housing the necessary switches, resistors, and test lamps at the upper end of a flash gun to enable ready assembly, convenient operation, and easy access to and replacement of the test lamps when required.

Another object of the invention is to provide an economical, compact, and practical arrangement for housing the test lamps, switches, and resistors, for both the regular and extension flash lamp circuits, such housing being located at the top of the flash gun and permitting ready assembly, convenient operation, and easy access to and replacement of the test lamps when required.

To these and other ends, the invention consists in the construction and arrangement of parts that will appear clearly from the following description when read in conjunction with the accompanying drawings, the novel features being pointed out in the claims following the specification.

In the drawings:

Fig. 1 is a view in front elevation of a conventional type of photographic camera with a flash gun attached, showing the latter constructed in accordance with a preferred embodiment of the invention;

Fig. 2 is a plan view of the flash gun with the flash lamp removed;

Fig. 3 is a rear elevation of the parts illustrated in Fig. 1 with the camera partially broken away;

Fig. 4 is a side elevation looking from right to left of Fig. 3;

Fig. 5 is a vertical sectional view on line 5—5 of Fig. 3, showing the flash gun and reflector in side elevation looking from left to right of Fig. 3;

Fig. 6 is a vertical sectional view through the flash gun and battery case, showing the two sections of the housing separated, before their completed assembly, and illustrating in elevation the conductors, switches, resistors, test lamps, and jacks in the respective housing sections, the conductors being entirely enclosed within the housing sections when the latter are secured together;

Fig. 7 is an enlarged horizontal sectional view taken centrally through the test lamps and housing;

Fig. 8 is a horizontal sectional view on the line 8—8 of Fig. 6 looking in the direction indicated;

Fig. 9 is an enlarged detail sectional view on the line 9—9 of Fig. 8;

Fig. 10 is an enlarged detail sectional view of one of the connecting jacks, and Fig. 11 is a diagrammatic view of the battery and flash lamp circuits, showing the respective test circuits, test lamps, resistors, and controlling switches.

Referring more particularly to the drawings in which like reference characters refer to the same parts throughout the several views, the invention is illustrated in connection with a photographic camera of conventional structure as indicated at 1, see Fig. 1, and including a shutter operable by the usual flexible element extending through the tube 2 and actuated by the plunger 3 for opening the shutter, see Figs. 4 and 5, while 4 designates the usual shutter synchronizer attachment from which conductors lead to the flash gun jacks for operating the flashlight when the shutter is operated.

The flash gun is mounted on a bracket 5 secured to the camera housing and is removably held thereon by a clamping element 6, as usual in this type of construction, the parts thus far described forming no part of the present invention, which has to do particularly with the means for testing the flash lamp and the flash gun structure with which it is incorporated.

The flash gun includes a battery case 7, see Figs. 3 to 5, within which is mounted the usual battery 8, indicated diagrammatically in Fig. 11, and surmounting the battery case is an enclosing housing within which the conductors and electrical units controlling the flash and test circuits are mounted, as will be described presently, said housing being illustrated as including two cooperating sections formed of any suitable insulating material indicated at 9 and 10 respectively, see Figs. 3 to 5 and 8, which are fastened to the battery case 7 by means of attaching screws 11 and 12 respectively. 13 designates a fastening plate extending under the bottom of the housing sections at 14, thence upwardly in engagement with their front walls and over the tops of the housing sections, being fastened to the housing sections by screws 15, and acting to hold the sections of the housing securely on the upper end of the battery case. 16 designates a strap extending around the upper ends of the rear face and sides of the housing sections, being fastened thereto by the screws 17 and including an offset portion 18, see Fig. 2, which affords a recess or space between the strap and the adjacent surface of the housing to receive the arm 19 carrying the usual lamp reflector 20. 21 designates a socket, see Fig. 2, suitably fastened by means of screws 22 to the plate 13 and to the top of the housing sections, and adapted to receive the flash lamp or bulb 23, while 24 designates a yieldable contact or conducting plunger actuated by the spring 25 and movable through an opening provided in the center of the sectional housing for engagement by the flash lamp bulb when the latter is inserted into the socket 21.

The flash circuit for the shutter synchronizer is completed from battery terminal 26 and conductor 27 to the spring plunger 24, thence through the flash lamp and to conducting socket 21 which is insulated by the housing, thence through a conductor 28 to a terminal 29 of the double-throw switch 30, and from the opposite terminal 31 through conductor 32 to the jack 33, while from the opposite jack 34 the conductor 35 leads to the opposite terminal 36 of the battery.

The jacks 33 and 34, see Figs. 3, 5 and 6, are arranged in the housing section 9 of the flash gun on the side toward the camera, and are adapted to receive the removable plugs of conductors 37 and 38 leading to the shutter synchronizer attachment, so that when the shutter is operated by the plunger 3, or by the solenoid tripper mechanism as will appear hereinafter, the terminals 29 and 31 are connected by the switch 30, as will be described presently, and the circuit is completed to the flash lamp for firing the latter.

It is essential and highly desirable to test the flash lamp and connections immediately before operating the shutter to effect an exposure, and to make such test quickly without affecting the picture by requiring any change of position of the camera or operator, and this is effected by a test circuit connected to the battery and flash lamp and controlled by the switch 30 which acts to close the test circuit and preferably, although not necessarily, open the flash circuit at the same time to prevent accidental closing of the flash circuit while the test is being made. It will be understood that the test circuit may be closed through the flash lamp without simultaneously opening the flash circuit, since the latter is always open until the shutter is operated.

Closing the test circuit is accomplished by a conductor 39, see Figs. 6 and 11, leading from the jack 34 to the terminal 40 of the switch 30 while the opposite terminal 41 is connected to conductor 42 which leads through a resistor 43 to a terminal 44 of the socket of test lamp 45, while from the other terminal of the test lamp socket extends a conductor 46 to the aforementioned terminal 29, from which the circuit is completed through conductor 28, the flash lamp and conductor 27 to the battery, and thence back through conductor 35 to the jack 34.

The switch 30, the interior construction of which is not shown, is of a conventional spring-actuated snap action double-throw type located within the section 9 of the housing, as shown in Fig. 6, and controlled by a manually operated device or push button 47 which extends through an opening in the rear wall of the housing, preferably at a point in proximity to and immediately above the test lamp 45, the push button 47 being normally in its outermost position and the terminals 29 and 31 connected to close the flash circuit, see Figs. 6 and 11. When push button 47 is moved inwardly against the action of the controlling spring 48, see Fig. 11, the terminals 29 and 31 are disconnected to open the flash circuit at this point, and the terminals 40 and 41 are connected to close the test circuit, which remains closed as long as the switch is held in its innermost position, and upon releasing the push button 47, the switch immediately returns to its outermost position to close the flash circuit and open the test circuit.

It is desirable to employ a double-throw switch in order to open the flash circuit automatically when the test circuit is closed and thus prevent accidental closing of both circuits at the same instant, although the test circuit can be closed by a single-throw switch operable to connect the terminals 40 and 41 when desired to make a test of the flash lamp, and it is within the province of the invention to employ such a single-throw switch without opening the flash circuit simultaneously. With such a construction, the terminals 29 and 31 would be permanently connected, and control of the flash circuit would depend on the synchronizer switch or the solenoid tripper to be described presently.

In order to accomplish the testing operation without firing the flashlight bulb, a test lamp such as a 2-volt 60 milliampere Westinghouse #48 lamp is employed with a 3-volt battery and a 20 ohm ½ watt carbon resistor, or a 4½-volt battery could be employed with a 30 to 35 ohm resistor, or a 6-volt battery could be employed with a 50 ohm resistor. When the test circuit is closed, current passes through the flash lamp and illuminates the test lamp, but the latter does not draw sufficient current to fire the flash lamp.

To make a test, the operator depresses the push button 47, at the upper left portion of the rear face of the housing, and if the test lamp 45 immediately beneath is lighted, this indicates that the flash lamp and connections are in perfect condition ready for firing. It shows electrical continuity throughout the flash lamp and its circuit since a current of approximately 60 milliamperes is flowing through the flash lamp. If the test lamp does not light, it indicates to the operator either an open circuit in the flash lamp requiring another flash lamp, poor contact between the flash lamp base and its socket, or some other electrical defect which the operator must then locate and correct before the flash lamp can be fired. The test lamp itself can readily be checked by short circuiting the flash lamp socket with a screw driver or the like and depressing the switch button.

It will be understood that when the camera shutter is opened by operating plunger 3, see Fig. 5, the flash synchronizer closes the flash circuit through the conductors 37 and 38, jacks 33 and 34, and the circuit already described, the jacks, conductors, test lamp, and resistor for the synchronizer flash circuit being mounted in the housing section 9 already described, and it is sometimes desirable to employ an extension flash lamp, in which case it is desirable to test the extension flash lamp and its circuit in the same manner as already described.

To accomplish this, the housing section 10 forming the second half of the enclosing housing is provided with jacks 49 and 50, see Figs. 6 and 11, to which the plugs 51 leading to an extension flash lamp 52 may be connected. The jacks 49 and 50 are also employed to connect the conductors leading to a solenoid tripper mechanism when the shutter is to be operated by a solenoid tripper.

The jack 50 is connected by conductor 53 to one side of the battery 8 while the other side of the battery is connected through conductor 35 to the previously mentioned jack 34, jack 33 is connected through conductor 54 to the terminal 55 of switch 56, the opposite terminal 57 being connected by conductor 58 to the jack 49, thus completing the extension flash circuit when the terminals 55 and 57 are connected by the double-throw switch 56 which operates in the same manner as the previously described switch 30, and is provided with an operating push button 59 extending through an opening in the rear wall of the housing section 10.

For testing the flash lamp in the extension circuit, there is provided a conductor 60 leading from jack 34 to the terminal 61 of the switch 56 while the opposite terminal 62 is connected through conductor 63 and resistor 64 to a terminal 65 of the test lamp socket which holds the test lamp 66, the test lamp socket being connected to terminal 57 by conductor 67 and by conductor 58 to jack 49.

The switch 56 being normally in position to close the flash circuit to the extension flash lamp, the latter is fired in the usual manner when the shutter is operated and the circuit closed by the shutter synchronizer, and the extension flash lamp can be tested immediately prior to operating the shutter by depressing the push button 59 to operate the switch connecting terminals 61 and 62, and thus close the test circuit through resistor 64 and test lamp 66. This opens the flash circuit and gives an indication of the condition of the extension flash lamp and its circuit connection by lighting or failing to light the test lamp 66. Upon releasing the push button 59, the switch is restored to its normal position to close the flash circuit and open the test circuit.

The test lamp 66 together with its resistor 64, controlling switch 56, and the jacks 49 and 50 are all arranged within the housing section 10, and when the latter is assembled and secured in cooperative relation to the housing section 9, the test lamps 45 and 66 for the two test circuits are disposed adjacent to each other and observable through openings in the rear wall near the top of the housing, facing the operator who can readily observe either or both of the test lamps. The push buttons 47 and 59 for controlling the two test circuit switches are located just above the test lamps of the rear of the housing, so that when the operator has made the proper adjustments and sighted the subject to be photographed, he can, just before operating the exposure shutter, close either one or both of the test circuits by operating either or both push buttons 47 and 59, and instantly determine the condition of the flash lamps and their circuits.

While the switch 56 disclosed in connection with the extension flash lamp is a double-throw switch operating similarly to the previously described switch 30, a single-throw switch can be employed also in the extension circuit if preferred and the extension flash circuit is not necessarily opened at the point of closing the test circuit, although automatic opening of the flash circuit simultaneously with closing the test circuit is sometimes desirable in order to prevent accidental closing of the flash circuit by unintentional operation of the solenoid tripper switch now to be described.

When the shutter is to be operated by a solenoid tripper mechanism instead of by the usual manual operation, the solenoid tripper mechanism plugs are connected into the jacks 49 and 50. In such case, it will be understood that jacks 33 and 34 are not connected, the circuit being open at this point, and to close the solenoid tripper circuit through the jacks 49 and 50, a switch 68 is employed, see Figs. 6 and 11, provided with a push button 69 that extends through the battery case 7 at the top and rear thereof just beneath the test lamps and the rear wall of the lamp housing, the push button 69 being at a convenient point for operation when the solenoid tripper is to be used. The switch 68 is connected to one side of the battery through terminal 36, see Fig. 6, and engages contact 70 which is connected through conductors 71 and 54 to terminal 55, so that when the push button 69 is operated to close the switch 70, the circuit is completed through the solenoid tripper mechanism and the flash lamp. This solenoid tripper switch may be used in conjunction with either of the flash lamps and flash circuits already described.

In some instances, it would be possible for the operator, intending to press one of the test lamp switch buttons 47 or 59 to operate the solenoid tripper push button 69 at the same time, causing inadvertent firing of the flash lamp, and it is to prevent this possibility that each test circuit is preferably controlled by a double-throw switch as already described, which at the time of closing the test circuit opens the corresponding flash circuit so that when a test circuit is closed, it is impossible to close either flash circuit by operating the solenoid tripper switch button 69.

Each test lamp is mounted as illustrated in Fig. 7, being arranged in an opening in the rear wall of its housing section and held therein by a removable knurled ring 72 threaded in the housing, the lamp projecting through an opening in the center of the ring and being observable therethrough from the rear of the housing at a point immediately in front of the operator. The lamp is held snugly against the opening in the ring by a socket member 73 that is held yieldably against the bottom of the lamp by the spring 74, the lamp and socket member being arranged within a tubular container 75 that is slotted at 76 to permit endwise movement of the connection 46 to the socket member 73, while the body of the lamp engages contact 77 projecting through the container 75 and fastened to the terminal 44 to which the previously mentioned conductor is secured. By removing the rings 72, either or both of the test lamps may be removed and replaced when necessary.

Each of the jacks 33, 34, 49 and 50 is constructed as shown in Fig. 10 and comprises a split conducting element 79 secured within a sleeve threaded into an opening in the housing and extending therethrough, the sleeve having a cap 80 of insulating material threaded on its outer end and having an opening 81 to receive the connecting plug. 82 designates an extension at the inner end of the split conducting member to which the conductors are suitably fastened.

The battery case 7 is provided with an annular groove 83 affording a flange 84 at its upper end, see Fig. 9, and the housing sections are undercut or grooved to afford shoulders 85 and 86 which extend above and below said flange 84 and lock the housing securely on the upper end of the battery case, thus affording a rigid assembly of the test lamps and controlling mechanism on the upper end of the flash gun.

While the invention has been described with reference to the structure shown, it is not restricted to the details herein disclosed, and this application is intended to cover such modifications or departures as may come within the purposes of the improvements or the scope of the following claims.

We claim:

1. The combination with a photographic flash gun for attachment to a camera including a flash circuit and battery for a flash lamp and a second flash circuit controlling an extension flash lamp, of two pairs of jacks for connection with a shutter synchronizer and said extension flash lamp respectively, of a test circuit connected with each of said flash circuits and each including a test lamp, a double-throw switch located in each of said pairs of flash and test circuits, spring means actuating each of said switches to a position in which it closes its flash circuit and opens its test circuit, a two-piece housing, one of said test lamps and switches being located in one section of said housing and the other of said test lamps and switches being located in the other section of said housing, said test lamps being observable from the rear face of the gun, manual means for each switch located on the rear face of the gun and operable to close its test circuit, and means in each of the test circuits acting to prevent firing the flash lamp when the test circuit through the flash lamp is closed.

2. A photographic flash gun for attachment to a camera comprising a battery case, a rectangular two-piece enclosing housing secured to the upper end of the battery case, a flash lamp socket mounted on top of said housing, a pair of jacks mounted on one section of said housing for connection with a shutter synchronizer and a pair of jacks mounted on the other section of said housing for connection with a second flash lamp, a flash circuit in each of said housing sections, a test circuit connected to each flash circuit and flash lamp, a test lamp in each test circuit located within the housing behind an opening in the rear wall of the housing, a double-throw switch located in each of said test circuits and within said housing sections respectively, an operating button for each of said switches extending through the rear wall of the housing sections respectively, and a resistor for each of said test circuits located in the housing sections respectively.

3. A photographic flash gun for attachment to a camera comprising a battery case, a rectangular two-piece enclosing housing secured to the upper end of the battery case, a flash lamp socket mounted on top of said housing, a pair of jacks located in one of said housing sections for connection with a shutter synchronizer and a pair of jacks mounted in the other of said housing sections for connection with a second flash lamp, a flash circuit in each of said housing sections, a test circuit connected to each flash circuit and flash lamp, test lamps in the test circuits located within the housing sections each behind an opening in the rear wall of its housing section, a double-throw switch located in each test circuit, spring means actuating each of said switches to a position in which its flash circuit is closed and its test circuit is open, an operating button for each switch extending through the rear wall of the housing, and a resistor in each test circuit located in the housing, the test lamp, resistor and switch for one test circuit being supported by one of said housing sections, and the test lamp, resistor, and switch for the other test circuit being supported by the other of said housing sections.

ALFRED L. LIDFELDT.
CLARENCE RAYMOND PICKENS.

REFERENCES CITED

The following references are of record in the file of this patent:

UNITED STATES PATENTS

| Number | Name | Date |
| --- | --- | --- |
| 1,217,026 | Ley | Feb. 20, 1917 |
| 1,286,891 | Crabtree | Dec. 3, 1918 |
| 1,345,201 | Ley | June 29, 1920 |
| 2,310,165 | Steiner | Feb. 2, 1943 |

FOREIGN PATENTS

| Number | Country | Date |
| --- | --- | --- |
| 370,142 | Great Britain | 1932 |
| 374,879 | Great Britain | 1932 |